United States Patent
He et al.

(10) Patent No.: US 10,333,725 B2
(45) Date of Patent: Jun. 25, 2019

(54) OVERLAY NETWORK WITH OPTIMIZED PACKET FLOODING

(71) Applicant: INTERNATIONAL BUSINESS MACHINES CORPORATION, Armonk, NY (US)

(72) Inventors: Guo Xing He, Suzhou (CN); Shi Xin Ruan, Wuxi (CN); Tamanna Z. Sait, San Jose, CA (US); Gang Tang, Nanjing (CN); Ming Shuang Xian, Wuxi (CN); Na Zhu, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 15/077,978

(22) Filed: Mar. 23, 2016

(65) Prior Publication Data
US 2017/0279624 A1    Sep. 28, 2017

(51) Int. Cl.
H04L 12/18 (2006.01)
H04L 29/08 (2006.01)
H04L 12/46 (2006.01)
G06F 9/455 (2018.01)
H04L 29/12 (2006.01)

(52) U.S. Cl.
CPC .......... *H04L 12/18* (2013.01); *G06F 9/45558* (2013.01); *H04L 12/1886* (2013.01); *H04L 12/4633* (2013.01); *H04L 67/10* (2013.01); *G06F 2009/4557* (2013.01); *G06F 2009/45595* (2013.01); *H04L 61/6022* (2013.01)

(58) Field of Classification Search
CPC .............................. H04L 12/18; H04L 12/4633
See application file for complete search history.

(56) References Cited

U.S. PATENT DOCUMENTS 8,848,509 B2    9/2014   Allan
2014/0237479 A1    8/2014   Baset et al.
(Continued)

FOREIGN PATENT DOCUMENTS

CN    104243269 A    12/2014

OTHER PUBLICATIONS

Peter Mell et al, The NIST Definition of Cloud Computing, National Institute of Standards and Technology, U.S. Department of Commerce, Special Publication 800-145, 2011.
(Continued)

*Primary Examiner* — Zhensheng Zhang
(74) *Attorney, Agent, or Firm* — Patrick J. Daugherty; Daugherty & Del Zoppo Co., LPA (57) ABSTRACT

Aspects provide optimized broadcast, unknown unicast, multicast packet (BUM) flooding. A flooding interface list is built for a network virtualization edge structure for an overlay network first virtual machine that includes one or more tunnel interfaces, one for each of a subset of the underlay network virtualization edge structures. In response to receiving a BUM packet from the first virtual machine at the first network virtualization edge structure, an overlay encapsulated packet is generated from the BUM packet and sent out to only those tunnel interfaces listed within the flooding interface list built for the virtual machine, thereby without sending to other network virtualization edge structures that do not have tunnel interfaces listed within the built flooding interface list.

18 Claims, 6 Drawing Sheets

(56) References Cited

U.S. PATENT DOCUMENTS

| | | | |
|---|---|---|---|
| 2014/0297872 A1 | 10/2014 | Narayanasamy et al. | |
| 2015/0055651 A1 | 2/2015 | Shen et al. | |
| 2015/0063194 A1* | 3/2015 | Yang .................. | H04L 47/15 370/312 |
| 2015/0128260 A1* | 5/2015 | Qiang ................ | H04L 63/0272 726/22 |
| 2015/0188769 A1* | 7/2015 | Gu ..................... | H04L 12/4641 726/3 |
| 2015/0280928 A1 | 10/2015 | Tessmer et al. | |
| 2016/0149795 A1* | 5/2016 | Kang .................. | H04L 45/02 370/254 |

OTHER PUBLICATIONS

M. Lasserre et al, Framework for Data Center (DC) Network Virtualization, Oct. 2014, Internet Engineering Task Force (IETF), http://www.rfc-editor.org/in-notes/pdfrfc/rfc7365.txt.pdf.

M. Lasserre et al, NVO3 Data Plane Requirements, Nov. 2013, Internet Engineering Task Force (IETF), http://rsync3.xml.resource.org/pdf/draft-letf-nvo3-dataplane-requirements-02.pdf.

* cited by examiner

OVERLAY NETWORK WITH OPTIMIZED PACKET FLOODING

BACKGROUND

A computer network or data network is a telecommunications network which allows computers to exchange data. In computer networks, networked computing devices exchange data with each other along network links (data connections). Connections between nodes may be established using a variety of mediums, including cable media and wireless media.

Overlay network technology is commonly deployed for network virtualization. An overlay network is a virtual computer network that is built on top of another existing "underlay" network infrastructure. Nodes in the overlay network may be described as virtual machines (VM's) that are connected by virtual or logical links corresponding to paths that may each utilize multiple physical links of the underlying (underlay) network. Distributed systems such as peer-to-peer networks and client-server applications may be described as overlay networks because their nodes run on top of the Internet or other underlying communications network. Of note, while the Internet was originally built as an overlay upon an underlay telephone network, via Voice-over Internet Protocol (VoIP) mechanisms, telephone networks are now commonly overlay networks built on top of the Internet as underlay network.

Overlay network mechanisms generally use Media Access Control (MAC) in Internet Protocol (IP) tunneling technology to provide a Layer-2 or data link layer for node-to-node data transfer between two directly connected nodes, as an extension over a shared Layer-3 underlay infrastructure network layer that provides the functional and procedural means of transferring variable length data sequences (sometimes called datagrams) from one node to another connected to the same network. Using Layer-2 extensions of underlay network assets to define overlay network node mechanisms is useful in overcoming limitations of the physical underlay network hardware, such as those arising from server rack capacities and geographical location boundaries, and may achieve flexibility for workload placement within a data center or between different data centers.

BRIEF SUMMARY

In one aspect of the present invention, a method for providing optimized broadcast, unknown unicast, multicast packet (BUM) flooding includes generating a first network virtualization edge structure that is in data communication with a plurality of other network virtualization edge structures in a data center underlay network. A flooding interface list is built for the first network virtualization edge structure for the overlay network first virtual machine that includes one or more tunnel interfaces, one for each of a subset of the underlay network virtualization edge structures that is less than a totality of the data center underlay network virtualization edge structures. In response to receiving a BUM packet from the first virtual machine at the first network virtualization edge structure, an overlay encapsulated packet is generated from the BUM packet received from the first virtual machine and sent out to only those tunnel interfaces that are listed within the flooding interface list built for the first network virtualization edge structure for the overlay network first virtual machine, thereby without sending to remainder others of the totality of network virtualization edge structures that are not within the subset having tunnel interfaces listed within the flooding interface list built for the first network virtualization edge structure for the overlay network first virtual machine.

In another aspect, a system has a hardware processor in circuit communication with a computer readable memory and a computer-readable storage medium having program instructions stored thereon. The processor executes the program instructions stored on the computer-readable storage medium via the computer readable memory and thereby generates a first network virtualization edge structure that is in data communication with a plurality of other network virtualization edge structures in a data center underlay network. A flooding interface list is built for the first network virtualization edge structure for the overlay network first virtual machine that includes one or more tunnel interfaces, one for each of a subset of the underlay network virtualization edge structures that is less than a totality of the data center underlay network virtualization edge structures. In response to receiving a BUM packet from the first virtual machine at the first network virtualization edge structure, an overlay encapsulated packet is generated from the BUM packet received from the first virtual machine and sent out to only those tunnel interfaces that are listed within the flooding interface list built for the first network virtualization edge structure for the overlay network first virtual machine, thereby without sending to remainder others of the totality of network virtualization edge structures that are not within the subset having tunnel interfaces listed within the flooding interface list built for the first network virtualization edge structure for the overlay network first virtual machine.

In another aspect, a computer program product for providing optimized broadcast, unknown unicast, multicast packet (BUM) flooding has a computer-readable storage medium with computer readable program code embodied therewith. The computer readable hardware medium is not a transitory signal per se. The computer readable program code includes instructions for execution which cause the processor to generate a first network virtualization edge structure that is in data communication with a plurality of other network virtualization edge structures in a data center underlay network. A flooding interface list is built for the first network virtualization edge structure for the overlay network first virtual machine that includes one or more tunnel interfaces, one for each of a subset of the underlay network virtualization edge structures that is less than a totality of the data center underlay network virtualization edge structures. In response to receiving a BUM packet from the first virtual machine at the first network virtualization edge structure, an overlay encapsulated packet is generated from the BUM packet received from the first virtual machine and sent out to only those tunnel interfaces that are listed within the flooding interface list built for the first network virtualization edge structure for the overlay network first virtual machine, thereby without sending to remainder others of the totality of network virtualization edge structures that are not within the subset having tunnel interfaces listed within the flooding interface list built for the first network virtualization edge structure for the overlay network first virtual machine.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
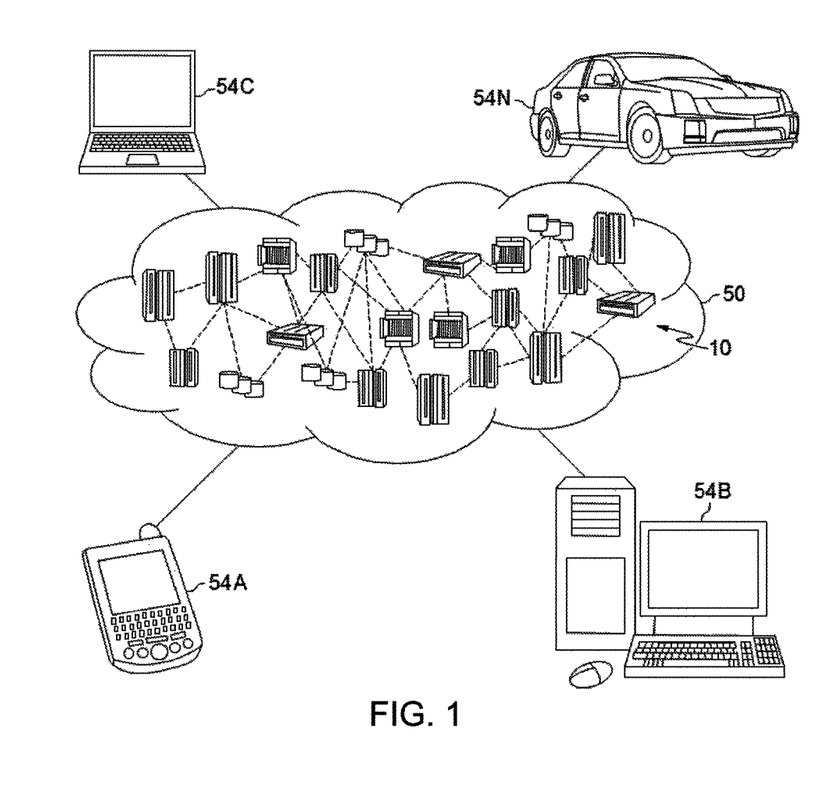
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
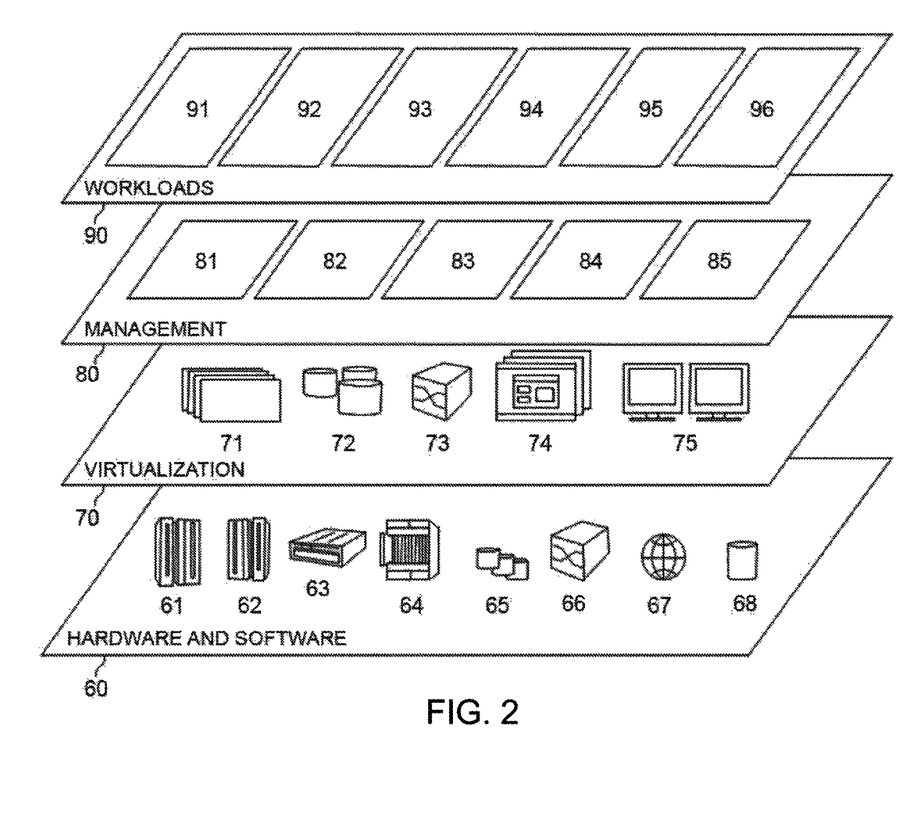
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for the selective location of supply amounts based on dynamic population density and travel distance metrics, as described below.

Figure 3:
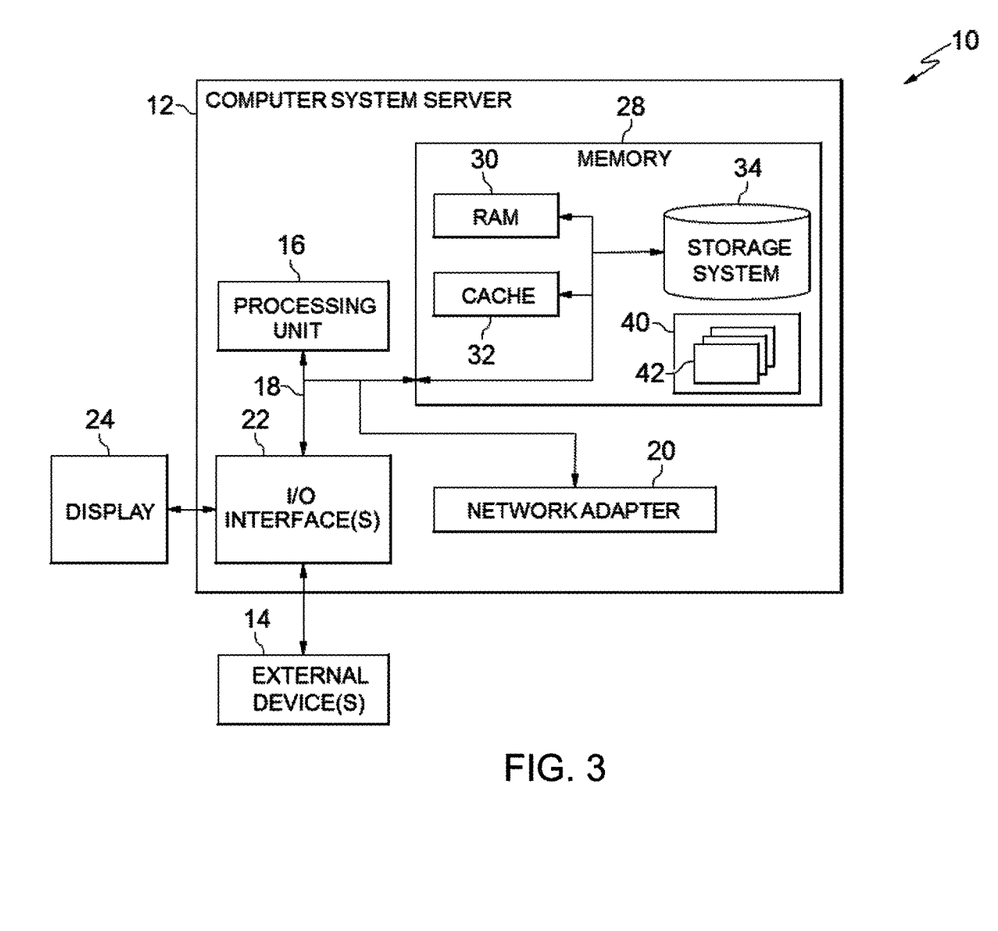
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The Internet Engineering Task Force Network Virtualization Overlay standard work group ("IETF NVO3") defines a set of specifications on requirements, architecture, use cases, and protocols for overlay network virtualization, including a variety of overlay protocols available for overlay tunnel encapsulation. Illustrative but not limiting or exhaustive examples include Virtual Extensible LAN (VxLAN), Network Virtualization using Generic Routing Encapsulation (NVGRE), Stateless Transport Tunneling (STT), Generic Network Virtualization Encapsulation (GENEVE), and Multiprotocol Label Switching (MPLS) over User Datagram Protocol (UDP), and still others will be apparent to one skilled in the art.

Overlay network technology generally uses either controller-based control schema or data plane learning structures. Some data plane learning control schemes in overlay network rely on underlay multicast, wherein one virtual network (VN) or a plurality of VNs can map to an underlay multicast group. BUM (Broadcast, Unknown unicast, Multicast) data packets communicated between overlay nodes in a virtual network are generally carried by mapped underlay multicast packets. Requirements associated with underlay network multicast may restrict options in the deployment of overlay network technology.

Overlay network implementations may be deployed in infrastructure-as-a-service (IaaS) structures that eliminate dependency on underlay multicast requirements by setting up full mesh connections over tunnels between underlay Network Virtualization Edge (NVE) structures or functional areas. An NVE is a common logical or physical point of policy enforcement and control for virtual privates networks (VPNs) for centralization of access to shared services, and may be physically located in a specific area of the network or spread around the network.

Generally, BUM packets in a VN are flooded out through all packet communication links ("tunnels") connecting various NVE via an ingress NVE, wherein an egress NVE delivers them to all end points in a target VN locally attached, or drops packets that do not contain the VN. One example of an IaaS overlay network is OpenStack®, a free and open-source software platform for cloud computing. (OPENSTACK is a trademark of the OpenStack Foundation in the United States or other countries.)

Prior art approaches that broadcast packets to all NVEs regardless of intended targets are inefficient. Unnecessary BUM flooding traffic that taxes system capacities increases dramatically as the number (N) of the NVE's (NVE (N)" and the number (M) of VN's (VN(M)) increase, in some cases proportionate to N*M. Large amounts of BUM flooding traffic may restrict the scale of implementation of an overlay network due to underlay hardware overhead limitations. Performance under conventional data plane learning structures may suffer due to demands place by unnecessary BUM traffic, decreasing network performance. L2 population mechanisms generally waste bandwidth of management Remote Procedure Call (RPC) channels, which may lead to instability in OPENSTACK implementations. Controller-based methods add deployment and operation costs. Routing protocol approaches, such as Border Gateway Protocol Ethernet Virtual Private Network (BGP-EVPN), may suffer from limitations imposed by converge timers in response to excessively long time periods. Changes in network topography to accommodate heavy BUM traffic may lead to route flapping, which occurs when a router alternately advertises a destination network via one route as unavailable, and then available again, in quick sequence.

Figure 4:
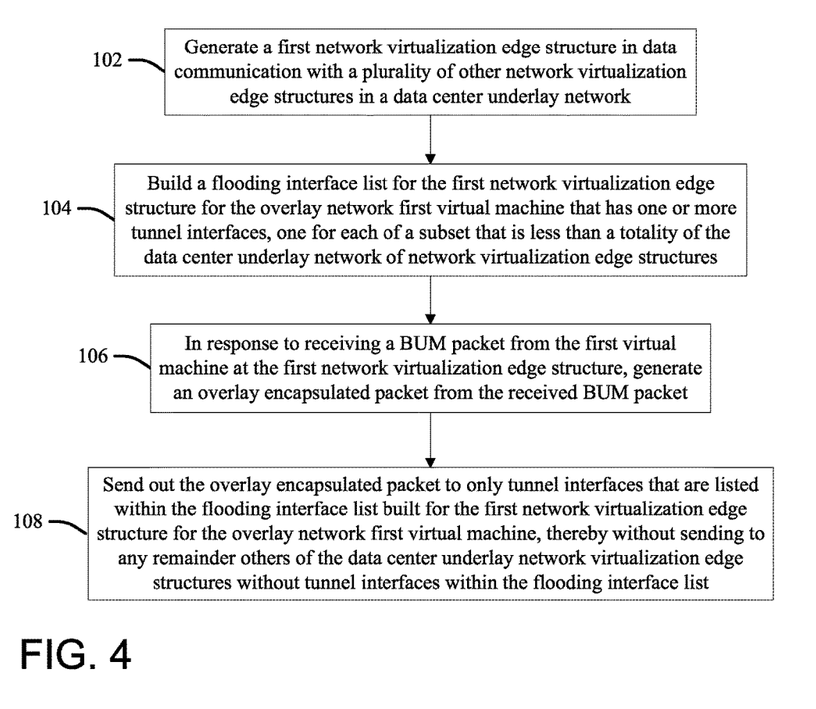
FIG. 4 is a flow chart illustration of an overlay network process or structure with optimized BUM flooding according to an embodiment of the present invention.

FIG. 4 illustrates an overlay network process or structure with optimized BUM flooding according to the present invention. At 102 a first network virtualization edge structure is generated (for example, by executing computer instructions on a computer processor) that is in data communication with a plurality of other network virtualization edge structures in a data center underlay network.

At 104 a flooding interface list is built for the first network virtualization edge structure for the overlay network first virtual machine that comprises one or more tunnel interfaces, one for each of a subset at least one of the underlay network virtualization edge structures that is less than a totality of the data center underlay network of network virtualization edge structures. The flooding list is generally built or otherwise created at 104 via proactive or reactive modes. In the proactive mode the NVE creates a flooding list for the network when the network is created. In a reactive mode, the NVE creates the flooding list in response to launching the VM on the NVE. The proactive mode will create data paths faster relative to the reactive mode.

At 106 in response to receiving a BUM packet from the first virtual machine at the first network virtualization edge structure, the first network virtualization edge structure generates an overlay encapsulated packet from the BUM packet received from the first virtual machine, and at 108 sends out the overlay encapsulated packet to only tunnel interfaces that are listed within the flooding interface list built for the first network virtualization edge structure for the overlay network first virtual machine. Thus, the BUM flooding executed at 108 limits the destination of the BUM flooding packet traffic to only those tunnel interfaces listed within the built list, thereby without sending the overlay encapsulated packet to any remainder others of the totality of the data center underlay network of network virtualization edge structures that are not within the subset of underlay network virtualization edge structures that have tunnel interfaces listed within the flooding interface list built for the first network virtualization edge structure for the overlay network first virtual machine.

Thus, in contrast to prior art structures, aspects of the present invention eliminate unnecessary BUM traffic in overlay network structures that use data plane learning control scheme and full mesh point-to-point channels or tunnel-interfaces. Each respective NVE contains a "flooding list" that contains a list of overlay channels or tunnel interfaces (sometimes referred to as "tifs") for the NVE, wherein the NVE uses the listed tunnel interfaces to flood the BUM for this VN. Initially, the VN list may contain all the tunnel-interfaces. Through control message interactions, aspects according to the present invention update their flooding lists to remove or add a tunnel interface to reflect the actual needs. These mechanisms provide advantage over the prior art by dramatically enhancing scalability and saving the system resources (network bandwidth, CPU cycles, etc.) from demands associated with processing unnecessary network traffic. Tunneling may be easily and quickly scaled up via additions to built interface lists for a given overlay network, and just as easily downscaled by pruning interfaces (and associated packet traffic), avoiding the processing of unnecessary packet traffic at NVE's that do not have overlay virtual machines initialized thereon.

Figure 5:
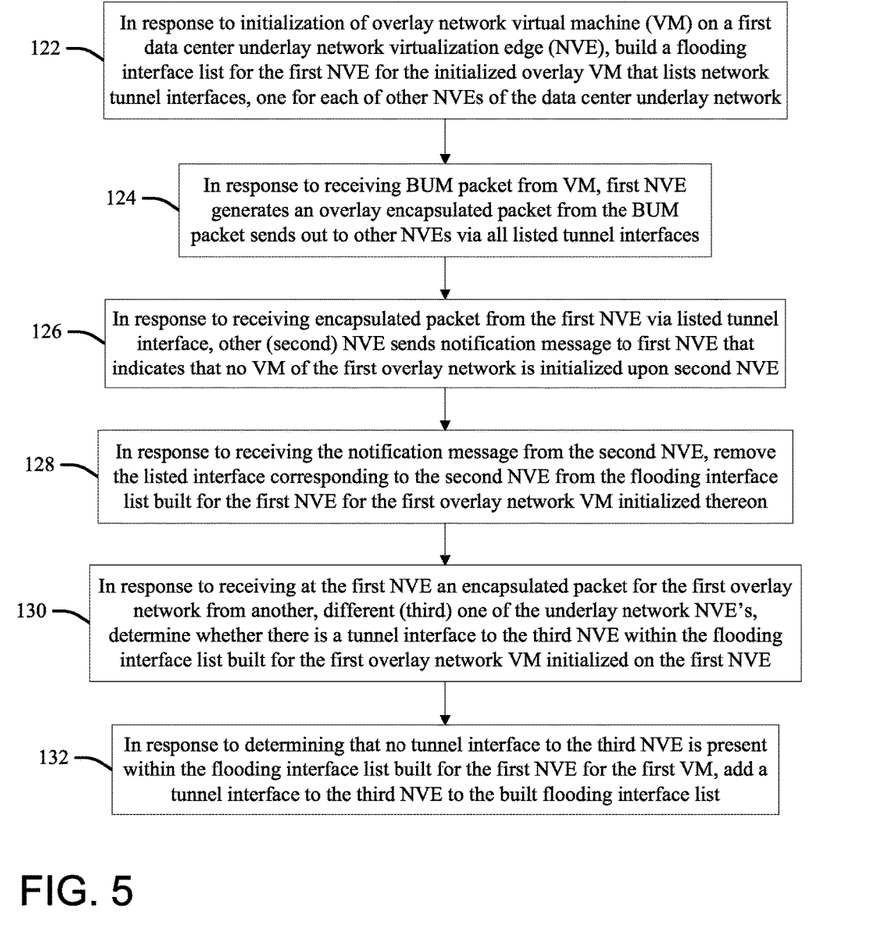
FIG. 5 is a flow chart illustration of an overlay network process or structure with optimized BUM flooding according to another embodiment of the present invention.

FIG. 5 illustrates another aspect or embodiment of the present invention, wherein at 122, in response to initialization of overlay network virtual machine (VM) on a first data center underlay network virtualization edge (NVE), in a reactive mode a flooding interface list is built for the first NVE for the initialized overlay VM that lists network tunnel interfaces, one for each of other NVEs of the data center underlay network. At 124, in response to receiving a BUM packet from the first overlay VM, the first underlay NVE generates an overlay encapsulated packet from the BUM packet, and sends out the overlay encapsulated packet to all of the listed tunnel interfaces, without sending said packet to any other tunnel interface that NVE that does not have a tunnel interface listed in the built list.

Aspects of the present invention dynamically and automatically prune built flooding interface list in response to receiving overlay encapsulated packets in a tunnel interface removal process. In the present example, another, different (second) underlay NVE does not have a virtual machine of the present (first) overlay network initialized thereupon. At 126, in response to receiving an encapsulated packet for the first overlay network from the first NVE via the listed tunnel interface to the second NVE, the second NVE sends a notification message to the first NVE that indicates that no virtual machine of the first overlay network is initialized upon the second NVE. At 128, in response to receiving said notification message from the second NVE, the first NVE removes the listed interface corresponding to the second NVE from the flooding interface list built for the overlay network first virtual network. Thus, the NVE dynamically prunes the built list to eliminate tunnel interfaces to each of the other NVE's that do not have VM's of the present overlay network initialized thereon, in response to corresponding notices from each received at 128, which may greatly reduce BUM flooding generated by the NVE for subsequent packets generated by the VM. For example, if none of the other underlay NVE's have VM's initialized upon them for the first overlay network, each will reply with corresponding notification messages at 106 in response to receiving encapsulated packets for the first overlay network, and each of their respective listed interfaces will be removed from the built list at 108, wherein the built list will thereby become empty and no BUM flooding to the other NVEs will result from a VM data packet. This would entirely eliminate demands upon the underlay network infrastructure for associated BUM flooding.

In a tunnel interface addition process, at 130, in response to receiving an encapsulated packet for the first overlay network from another, different (third) one of the underlay network NVE's, the first underlay NVE determines whether there is a tunnel interface to the third NVE within the flooding interface list built for the first overlay network virtual machine initialized on the first NVE. At 132, in response to determining that no tunnel interface to the third NVE is present within the flooding interface list built for the first VM, the first NVE adds a tunnel interface to the third NVE to the built flooding interface list.

Thus, the built list is dynamically updated with new interfaces in response to receiving encapsulated packets for the first overlay network from other VM's of the same overlay network. In some embodiments, encapsulated packets are sent out (including to the first NVE at 130) as each of the other VM's initialize and boot up on other ones of the underlay network NVE's. In some examples, a VM does not send out a packet when it boots up, and in some aspects of the present invention the first NVE simulates the VM to send out an L2 broadcast packet to the other underlay network NVE's (at 130), wherein the source MAC is the VM MAC. Thus, the L2 broadcast packet triggers each of the other underlay network NVE's to learn the location of the new VM.

Figure 6:
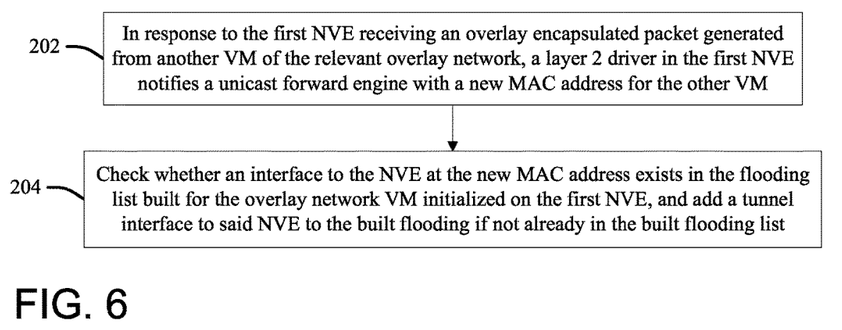
FIG. 6 is a flow chart illustration of an overlay network process or structure with optimized BUM flooding according to another embodiment of the present invention.

FIG. 6 illustrates an alternative embodiment of the present invention, wherein at 202, in response to a first NVE receiving an overlay encapsulated packet generated from another VM of the relevant overlay network, a layer 2 driver in the first NVE notifies a unicast forward engine with a new MAC address for the other VM. When this event is captured, at 204 the first NVE checks whether an interface to an NVE at the new MAC address (sending said overlay encapsulated packet) exists in the flooding list built for the overlay network VM initialized on the first NVE, and if not, adds a tunnel interface to said NVE to the built flooding list. Aspects according to this example thereby avoid checking the built VN flooding list every time the first NVE receives packets.

Figure 7:
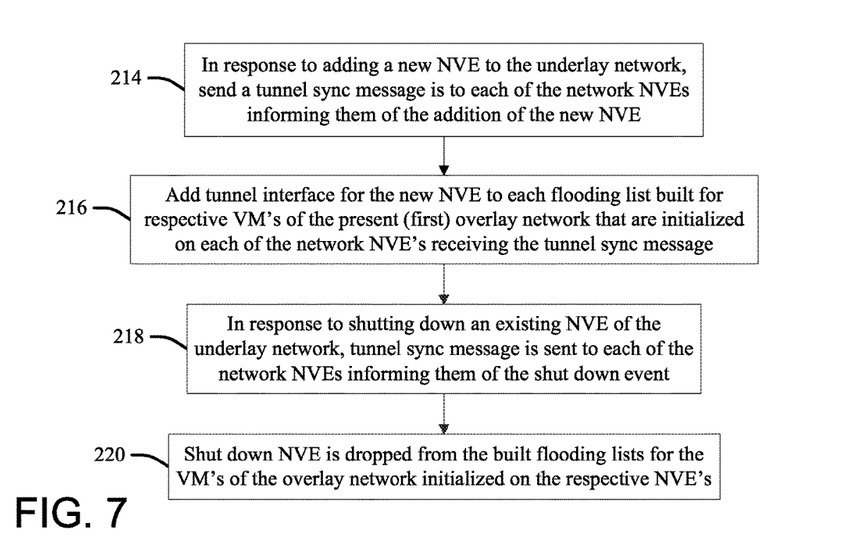
FIG. 7 is a flow chart illustration of an overlay network process or structure with optimized BUM flooding according to another embodiment of the present invention.

FIG. 7 illustrates an alternative embodiment of the present invention, wherein at 214, in response to adding a new NVE to the underlay network, a tunnel sync message is sent to each of the network NVEs informing them of this event, and at 216 a tunnel interface for the new NVE is added to each of the built flooding lists for respective VM's of the present (first) overlay network that are initialized on each of the network NVE's receiving the tunnel sync message. At 218, in response to shutting down an existing NVE of the underlay network, another tunnel sync message is sent to each of the network NVEs informing them of this event, and accordingly at 220, the shutdown NVE is dropped from the built flooding lists for the VM's of the overlay network initialized on the respective NVE's. Thus, the tunnel sync messages are used to directly and dynamically update the flooding lists by adding or removing NVEs.

Notification messages from NVE's that are used to notify other NVE's to add or remove tunnel interfaces to or from a specified overlay VN flooding list may have a variety of formats. In one embodiment, a notification message includes an action bit or bits (signifying delete from or add to a flooding interface list), a network ID, and an NVE address to be added or deleted. In some embodiments, notification messages are put into an Internet Control Message Protocol (ICMP) packet, an error-reporting protocol that network devices such as routers use to generate error messages to the source IP address when network problems prevent delivery of IP packets. However, embodiments of the present invention are not limited to ICMP structures, and other protocols may be practiced and used.

Some embodiments also incorporate network timers in order to limit or mitigate the impact of large numbers of received notification messages. In such examples on each underlay NVE, for each network and each NVE, when notification is sent out to a given NVE, a timer is initialized and activated, wherein until the timer expires (a designated time period elapse) no more notifications are sent out to that NVE.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing optimized broadcast, unknown unicast, multicast packet (BUM) flooding, comprising executing on a computer processor the steps of:
    generating a first network virtualization edge (NVE) structure that is in data communication with a plurality of other NVE structures in a data center underlay network, wherein the first NVE structure comprises a plurality of tunnel interfaces to the plurality of other NVE structures in the data center underlay network, each tunnel interface corresponding to one of the plurality of other NVE structures;
    building a flooding interface list for the first NVE structure for a first virtual machine (VM) of a first overlay network in response to an initialization of the first VM on the first NVE structure, wherein building the flooding interface list comprises listing one tunnel interface for each of the plurality of other NVEs in the data center underlay network;
    in response to receiving a BUM packet from the first VM at the first NVE structure, generating an overlay encapsulated packet from the BUM packet received from the first VM;
    sending out the overlay encapsulated packet to only tunnel interfaces that are listed within the flooding interface list built for the first NVE structure for the first VM; and
    receiving a notification message from another, second NVE structure of the plurality of the other NVE structures that no VM of the first overlay network is initialized upon the second NVE structure, wherein the received notification message from the second NVE structure is in response to the second NVE structure receiving the sent out overlay encapsulated packet from the first NVE; and
    in response to receiving the notification message from the second NVE that no VM of the first overlay network is initialized on the second NVE and to determining that a tunnel interface to the second NVE structure is listed within the flooding interface list built for the first NVE structure, directly deleting the tunnel interface to the second NVE structure from the flooding interface list built for the first NVE structure for the first VM of the first overlay network.

2. The method of claim 1, further comprising:
    in response to receiving a second BUM packet from the first virtual machine at the first network virtualization edge structure, generating a second overlay encapsulated packet from the second BUM packet received from the first virtual machine; and
    sending out the second overlay encapsulated packet to only tunnel interfaces that are listed within the flooding interface list built for the first network virtualization edge structure for the first virtual machine which excludes the second network virtualization edge structure having no virtual machines for the first overlay network initialized thereon.

3. The method of claim 1, further comprising:
    in response to receiving an encapsulated packet for a different, second overlay network from another, third one of the plurality of the other NVE structures, and to determining that no VM of the second overlay network is initialized upon the first NVE structure, sending a notification message to the third one of the plurality of other NVE structures that no VM of the second overlay network is initialized upon the first NVE structure, wherein the first overlay network is initialized with the first VM on the first NVE structure.

4. The method of claim 1, further comprising:
    in response to receiving an encapsulated packet for the first overlay network from another, fourth one of the plurality of the other NVE structures, and to determining that a tunnel interface to the fourth NVE structure is not listed within the flooding interface list built for the first NVE structure for the first VM of the first overlay network, adding a tunnel interface for the fourth NVE structure to only the flooding interface list built for the first NVE structure for the first VM of the first overlay network, wherein the first NVE structure comprises the flood list of the first overlay network and a second flood list for second VM of a second overlay network.

5. The method of claim 1, further comprising:
    in response to receiving an overlay encapsulated packet generated from another, fifth one of the plurality of the underlay network virtualization edge structures, a layer 2 driver of the first network virtualization edge structure notifying a unicast forward engine with a new Media Access Control address for a second virtual machine of the first overlay network initialized on the fifth network virtualization edge structure;

checking whether an interface to the fifth network virtualization edge structure at the new Media Access Control address exists in the flooding list built for the first virtual machine of the first overlay network initialized on the first network virtualization edge structure; and adding a tunnel interface to said fifth network virtualization edge structure to the flooding list built for the first virtual machine of the first overlay network initialized on the first network virtualization edge structure in response to determining that the new Media Access Control address does not exist in the flooding list built for the first virtual machine of the first overlay network initialized on the first network virtualization edge structure.

6. The method of claim 1, further comprising:

in response to receiving a tunnel sync message that informs the first network virtualization edge structure that another, sixth network virtualization edge structure has been added to the underlay network, the first network virtualization edge structure adding a tunnel interface to the sixth network virtualization edge structure to the flooding list built for the first virtual machine of the first overlay network initialized on the first network virtualization edge structure.

7. The method of claim 1, further comprising:

in response to receiving a tunnel sync message that informs the first network virtualization edge structure that another, seventh network virtualization edge structure of the plurality of other network virtualization edge structures has been shut down, the first network virtualization edge structure removing a tunnel interface to the seventh network virtualization edge structure from the flooding list built for the first virtual machine of the first overlay network initialized on the first network virtualization edge structure.

8. The method of claim 1, further comprising:

integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the steps of generating the first network virtualization edge structure in data communication with the plurality of other network virtualization edge structures in the data center underlay network, building the flooding interface list for the first network virtualization edge structure for the first virtual machine of the first overlay network, generating the overlay encapsulated packet from the BUM packet received from the first virtual machine in response to receiving the BUM packet from the first virtual machine at the first network virtualization edge structure, and sending out the overlay encapsulated packet to only the tunnel interfaces listed within the flooding interface list built for the first network virtualization edge structure for the first virtual machine of the first overlay network, wherein the computer readable storage medium is not a transitory signal per se.

9. The method of claim 8, wherein the computer-readable program code is provided as a service in a cloud environment.

10. A system, comprising:

a processor;

a computer readable memory in circuit communication with the processor; and a computer readable storage medium in circuit communication with the processor;

wherein the computer readable storage medium is not a transitory signal per se;

wherein the processor executes program instructions stored on the computer-readable storage medium via the computer readable memory and thereby:

generates a first network virtualization edge structure (NVE) that is in data communication with a plurality of other NVE structures in a data center underlay network, wherein the first NVE structure comprises a plurality of tunnel interfaces to the plurality of other NVE structures in the data center underlay network, each tunnel interface corresponding to one of the plurality of other NVE structures;

builds a flooding interface list for the first NVE structure for a first virtual machine (VM) of a first overlay network in response to an initialization of the first VM on the first NVE structure, wherein building the flooding interface list comprises listing one tunnel interface for each of the plurality of other NVEs in the data center underlay network;

in response to receiving a BUM packet from the first VM at the first NVE structure, generates an overlay encapsulated packet from the BUM packet received from the first VM;

sends out the overlay encapsulated packet to only tunnel interfaces that are listed within the flooding interface list built for the first NVE structure for the first VM; and receiving a notification message from another, second NVE structure of the plurality of the other network virtualization edge structures that no VM of the first overlay network is initialized upon the second NVE structure, wherein the notification message from the second NVE structure is in response to the second NVE structure receiving the sent out overlay encapsulated packet from the first NVE; and in response to receiving the notification message from the second NVE structure that no VM of the first overlay network is initialized upon the second NVE and to determining that a tunnel interface to the second NVE structure is listed within the flooding interface list built for the first NVE structure, directly deleting the tunnel interface to the second NVE structure from the flooding interface list built for the first NVE structure for the first VM of the first overlay network.

11. The system of claim 10, wherein the processor executes the program instructions stored on the computer-readable storage medium via the computer readable memory and thereby further:

in response to receiving a second BUM packet from the first virtual machine at the first network virtualization edge structure, generating a second overlay encapsulated packet from the second BUM packet received from the first virtual machine; and sending out the second overlay encapsulated packet to only tunnel interfaces that are listed within the flooding interface list built for the first network virtualization edge structure for the first virtual machine which excludes the second network virtualization edge structure having no virtual machines for the first overlay network initialized thereon.

12. The system of claim 10, wherein the processor executes the program instructions stored on the computer-readable storage medium via the computer readable memory and thereby further:
in response to receiving an encapsulated packet for a different, second overlay network from another, third one of the plurality of the other NVE structures, and to determining that no VM of the second overlay network is initialized upon the first NVE structure, sends a notification message to the third one of the plurality of other NVE structures that no VM of the second overlay network is initialized upon the first NVE structure, wherein the first overlay network is initialized with the first VM on the first NVE structure.

13. The system of claim 10, wherein the processor executes the program instructions stored on the computer-readable storage medium via the computer readable memory and thereby further:
in response to receiving an encapsulated packet for the first overlay network from another, fourth one of the plurality of the other NVE structures, and to determining that a tunnel interface to the fourth NVE structure is not listed within the flooding interface list built for the first NVE structure for the overlay network first VM, adds a tunnel interface for the fourth NVE structure to the flooding interface list built for the first NVE structure for the overlay network first VM, wherein the first NVE structure comprises the flood list of the first overlay network and a second flood list for second VM of a second overlay network.

14. A computer program product for providing optimized broadcast, unknown unicast, multicast packet (BUM) flooding, the computer program product comprising:
a computer readable storage medium having computer readable program code embodied therewith, wherein the computer readable storage medium is not a transitory signal per se, the computer readable program code comprising instructions for execution by a processor that cause the processor to:
generate a first network virtualization edge (NVE) structure that is in data communication with a plurality of other NVE structures in a data center underlay network, wherein the first NVE structure comprises a plurality of tunnel interfaces to the plurality of other NVE structures in the data center underlay network, each tunnel interface corresponding to one of the plurality of other NVE structures;
build a flooding interface list for the first NVE structure for a first virtual machine (VM) of a first overlay network in response to an initialization of the first VM on the first NVE structure, wherein building the flooding interface list comprises listing one tunnel interface for each of the plurality of other NVEs in the data center underlay network;
in response to receiving a BUM packet from the first VM at the first NVE structure, generate an overlay encapsulated packet from the BUM packet received from the first VM;
send out the overlay encapsulated packet to only tunnel interfaces that are listed within the flooding interface list built for the first NVE structure for the first VM; and
receiving a notification message from another, second NVE structure of the plurality of the other NVE structures that no VM of the first overlay network is initialized upon the second NVE structure, wherein the notification message is in response to the second NVE structure receiving the sent out overlay encapsulated packet from the first NVE structure; and
in response to receiving the notification message from the second NVE structure that no VM of the first overlay network is initialized upon the second NVE structure and to determining that a tunnel interface to the second NVE structure is listed within the flooding interface list built for the first network virtualization edge structure, directly delete the tunnel interface to the second NVE structure from the flooding interface list built for the first NVE structure for the first VM of the first overlay network.

15. The computer program product of claim 14, wherein the computer readable program code instructions for execution by the processor further cause the processor to:
in response to receiving a second BUM packet from the first virtual machine at the first network virtualization edge structure, generate a second overlay encapsulated packet from the second BUM packet received from the first virtual machine; and
send out the second overlay encapsulated packet to only tunnel interfaces that are listed within the flooding interface list built for the first network virtualization edge structure for the first virtual machine which excludes the second network virtualization edge structure having no virtual machines for the first overlay network initialized thereon.

16. The computer program product of claim 14, wherein the computer readable program code instructions for execution by the processor further cause the processor to:
in response to receiving an overlay encapsulated packet generated from another, fifth one of the plurality of the underlay network virtualization edge structures, cause a layer 2 driver of the first network virtualization edge structure to notify a unicast forward engine with a new Media Access Control address for a second virtual machine of the first overlay network initialized on the fifth network virtualization edge structure;
check whether an interface to the fifth network virtualization edge structure at the new Media Access Control address exists in the flooding list built for the first virtual machine of the first overlay network initialized on the first network virtualization edge structure; and
add a tunnel interface to said fifth network virtualization edge structure to the flooding list built for the first virtual machine of the first overlay network initialized on the first network virtualization edge structure in response to determining that the new Media Access Control address does not exist in the flooding list built for the first virtual machine of the first overlay network initialized on the first network virtualization edge structure.

17. The computer program product of claim 14, wherein the computer readable program code instructions for execution by the processor further cause the processor to:
in response to receiving a tunnel sync message that informs the first network virtualization edge structure that another, sixth network virtualization edge structure has been added to the underlay network, add a tunnel interface to the sixth network virtualization edge structure to the flooding list built for the first virtual machine of the first overlay network initialized on the first network virtualization edge structure.

18. The computer program product of claim 14, wherein the computer readable program code instructions for execution by the processor further cause the processor to:

in response to receiving a tunnel sync message that another, seventh network virtualization edge structure of the plurality of other network virtualization edge structures has been shut down, remove a tunnel interface to the seventh network virtualization edge structure from the flooding list built for the first virtual machine of the first overlay network initialized on the first network virtualization edge structure.

\* \* \* \* \*